Dec. 8, 1936.　　　M. J. GALVIN ET AL　　　2,063,426
CLUTCH
Filed Dec. 5, 1934
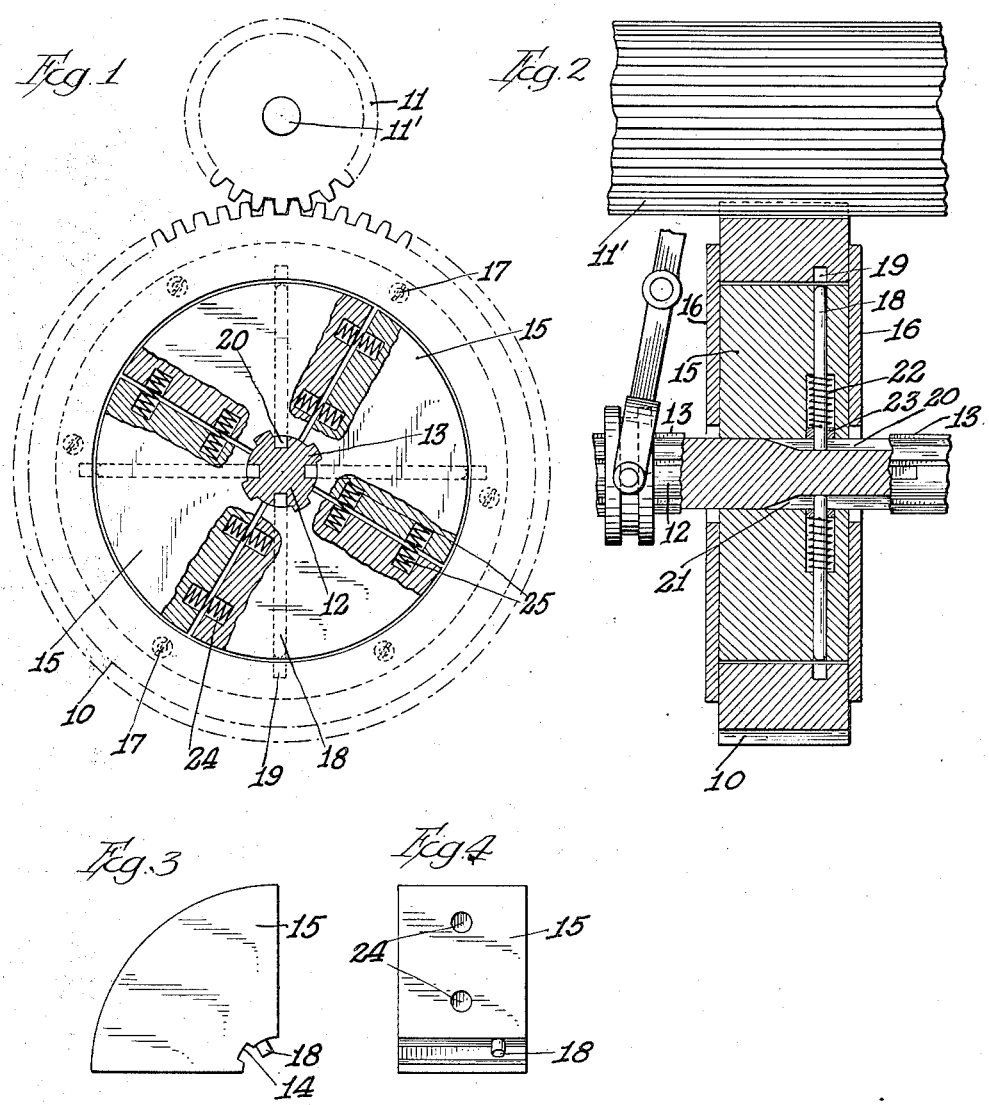
Inventor
Von Fenner
Michael J. Galvin Patented Dec. 8, 1936

2,063,426

UNITED STATES PATENT OFFICE 2,063,426

CLUTCH

Michael J. Galvin and Von Fenner, Chicago, Ill.

Application December 5, 1934, Serial No. 756,140

6 Claims. (Cl. 192—53)

Our invention relates to a clutch, such as may be used in motor vehicles and in various other places and it is an object of the same to provide an improved clutch of the type in which there is first a frictional engagement of driving and driven elements for slow and easy starting, followed later on by a positive driving engagement between driving and driven elements.

Referring to the drawing, which is made a part of this application and in which similar reference characters indicate similar parts:

Fig. 1 is an end elevation of our device partly in section,

Fig. 2, a longitudinal vertical section, and

Figs. 3 and 4, details of a shoe forming part of the invention.

In the drawing, reference character 10 indicates a driven clutch element in the form of a ring gear having teeth meshing with teeth of a gear 11 on a shaft 11', said last-named gear and shaft being conventional elements forming no part of our invention. A shaft 12 is mounted concentrically with the ring gear 10 and forms a driving element for the other parts of the clutch, for which purpose it is provided with integral fins 13 engaging slots 14 (Fig. 3) in each of a plurality of sector-shaped shoes 15 arranged about the shaft 12 and within the periphery of the ring gear 10. It will be seen that the shaft 12 therefore provides a positive driving means for the shoes 15.

The outer faces of the shoes 15 are shaped to match the inner periphery of the ring gear and, as the shoes are free to move outwardly to a limited extent when the shaft 12 is driven, it will be seen that centrifugal force will cause them to press against the inner periphery of the ring gear so as to drive the same by frictional engagement. The shoes are held against endwise movement with reference to the shaft and ring gear by means of end plates 16, 16 which may be secured to the ring gear by screws 17 or in other suitable manner. It will be seen that the outward movement of the shoes for driving the ring gear is so limited that the fins 13 will remain in driving engagement with the slots 14 of the shoes.

For driving the ring gear positively from the shaft 12 we provide radially movable pins 18 which are guided in passages in the shoes 15, there being preferably a pin for each shoe and the pins being preferably each located at a point relatively near to one of the radial faces of a shoe. Each pin is adapted to engage any one of a series of recesses 19 in the ring gear when the pins are projected outwardly. For so projecting the pins we arrange the shaft 12 for axial movement and provide it with axial slots 20 merging at one end into inclines 21. It will be seen that when the shaft is moved to the right in Fig. 2 the pins will be forced outwardly as soon as their inner ends begin to ride up on the inclines 21, whereby they will be forced into the recesses 19 when the pins come to a position to register with such recesses and, due to the shape of the inclines, the pins can be forced securely home into the recesses for positively driving the ring gear from the shaft 12 through the shoes and the pins. Springs 22, here shown as coil springs encircling the pins, bear at one end against enlarged portions of the passages in which the pins are located and are secured at the other end to the pins so as to force them normally inward to idle position, as shown in Fig. 2. Collars 23 are interposed between the springs 22 and the shaft 12, said collars guiding the pins and holding them in proper place in the enlarged parts of said passages.

The shoes are each provided with recesses in their radial faces, as indicated at 24 in Fig. 4, the recesses in adjacent faces of each pair of shoes registering with one another and springs 25 are located in said recesses, these springs serving to space the shoes from one another and hold them in uniformly spaced relation so that all shoes will engage the inner periphery of the ring gear at the same time and with equal pressure. Preferably the springs are secured at their ends to the shoes by any suitable securing means, so that they tend to hold the shoes against outward movement until the tension of the springs is overcome by the centrifugal force acting thereon due to the rotation of shaft 12 and the shoes.

The action of our device will apparently be understood from the foregoing but may be summarized as follows: When the shaft 12 is rotated, with the parts in the position of Fig. 2, the shoes 15 will fly outward as soon as the speed of rotation is sufficient for centrifugal force to overcome the tension of springs 25. The shoes will then engage the inner periphery of the ring gear and will gradually start to rotate the same, the speed of rotation of the ring gear and parts driven thereby increasing as the speed of shaft 12 increases. When the speed of the driven parts has been increased to a sufficient extent, or nearly to the speed of shaft 12, said shaft is moved endwise to the right in Fig. 2, thereby forcing the pins 18 outward into recesses 19 so as to make a positive driving connection between shoes 15 and ring gear 10. At this time there may also be a positive connection between the shoes and the shaft 12 through the pins 18, if they have not been moved to extreme position, but this is not relied on for driving the shoes, since there is a positive driving connection between the shaft 12 and the shoes through the fins 13 and the grooves 14 of the shoes.

It will be obvious to those skilled in the art that various changes may be made in our device without departing from the spirit of the invention, therefore we do not limit ourselves to what is shown in the drawing or described in the specification but only as indicated in the appended claims.

Having thus fully described our said invention, what we claim as new and desire to secure by Letters Patent is:

1. In a clutch, a rotary driven member, an axially movable rotary driving member concentric therewith, means for connecting said members frictionally comprising radially movable centrifugal shoes interposed between said members and secured to said driving member for rotation therewith, locking elements movable into position to lock said shoes to said driven member, and positive operating connections between said driving member and said locking elements operable upon axial movement of said driving member.

2. In a clutch, a rotary driven member, an axially movable rotary driving member concentric therewith, radially movable centrifugally operated shoes interposed between said members and secured to said driving member for rotation therewith, locking elements movable into position to lock said shoes positively to said driven member, connections between said driving member and said locking elements operable upon axial movement of said driving member, and means tending to withdraw said shoes from said driven member.

3. A device as in claim 2, said last-named means holding said shoes in uniformly-spaced relation.

4. A device as in claim 2, said shoes having alined recesses in opposed faces thereof, and resilient means in the respective pairs of alined recesses, such means tending both to hold said shoes in idle position and to space them apart.

5. In a clutch, a rotary driven member having holes in its inner periphery, an axially movable driving member concentric therewith, said driving member having axial slots sloping outwardly at one end thereof; radially movable pins resting in said slots and movable by the slopes thereof into engagement with said holes, means for guiding said pins, and means for normally retracting said pins and centrifugal shoes slidable on said pins for preliminary frictional engagement with the driven member.

6. In a clutch, a rotary driven member having recesses in its inner periphery, an axially movable driving member concentric therewith, said driving member having axial slots sloping outwardly at one end thereof, radially movable pins resting in said slots and movable by the slopes thereof into engagement with said recesses, centrifugal shoes adapted to connect said driving and driven members frictionally, said shoes having radial apertures for guiding said pins, and means for normally holding said pins and said shoes in idle position.

VON FENNER.
MICHAEL J. GALVIN.